(12) United States Patent
Liu

(10) Patent No.: US 12,082,130 B2
(45) Date of Patent: Sep. 3, 2024

(54) METHOD AND APPARATUS FOR SENDING SYNCHRONIZATION SIGNAL

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 730 days.

(21) Appl. No.: 17/290,984

(22) PCT Filed: Nov. 2, 2018

(86) PCT No.: PCT/CN2018/113822
§ 371 (c)(1),
(2) Date: Dec. 28, 2021

(87) PCT Pub. No.: WO2020/087538
PCT Pub. Date: May 7, 2020

(65) Prior Publication Data
US 2022/0124646 A1 Apr. 21, 2022

(51) Int. Cl.
*H04W 56/00* (2009.01)
*H04W 4/40* (2018.01)
*H04W 24/08* (2009.01)

(52) U.S. Cl.
CPC ........... *H04W 56/001* (2013.01); *H04W 4/40* (2018.02); *H04W 24/08* (2013.01)

(58) Field of Classification Search
CPC ...... H04W 56/001; H04W 4/40; H04W 24/08
See application file for complete search history.

(56) References Cited

U.S. PATENT DOCUMENTS

| | | | | |
|---|---|---|---|---|
| 2020/0083971 A1* | 3/2020 | Zhong | ................. | H04B 7/0617 |
| 2021/0127341 A1* | 4/2021 | Yasukawa | ............. | H04W 24/08 |
| 2021/0329598 A1* | 10/2021 | Wang | ...................... | H04W 4/40 |

FOREIGN PATENT DOCUMENTS

| | | |
|---|---|---|
| CN | 107005958 A | 8/2017 |
| CN | 107852685 A | 3/2018 |
| CN | 108352979 A | 7/2018 |
| CN | 109314845 A | 2/2019 |
| WO | 2018062850 A1 | 4/2018 |

OTHER PUBLICATIONS

Second Chinese Office Action issued to Chinese Application No. 201880002470.8, dated Jul. 9, 2021 with English translation, (24p).
Huawei, HiSilicon, "D2D Synchronization Procedure for Out-of-Coverage", Discussion and Decision, 3GPP TSG RAN WG1 Meeting #78, R1-142845, Dresden, Germany, Aug. 18-22, 2014, (7p).

* cited by examiner

Primary Examiner — Won Tae C Kim
(74) Attorney, Agent, or Firm — Arch & Lake LLP

(57) ABSTRACT

Methods, apparatuses, and non-transitory computer-readable storage mediums are provided for sending a synchronization signal. A user equipment (UE) may measure the signal intensity of a received communication signal. The UE may also determine a target configuration parameter for sending a synchronization signal according to the signal intensity of the received communication signal. The UE may further send the synchronization signal by using the target configuration parameter.

9 Claims, 7 Drawing Sheets

--- measuring a signal intensity of a received communication signal — 101

↓ determining a target configuration parameter for sending a synchronization signal according to the signal intensity of the communication signal — 102

↓ sending the synchronization signal by using the target configuration parameter — 103

METHOD AND APPARATUS FOR SENDING SYNCHRONIZATION SIGNAL

CROSS-REFERENCE TO RELATED APPLICATION

The present application is a national phase application of PCT International Application No. PCT/CN2018/113822 filed on Nov. 2, 2018, the entire contents thereof are incorporated herein by reference in their entireties for all purposes.

TECHNICAL FIELD

The present disclosure relates to the field of communication technology, and in particular, to a method and an apparatus for sending a synchronization signal.

BACKGROUND

With the development of technologies such as autonomous driving, the use of 5G New Radio (NR) technology to support the Vehicle to Everything (V2x) communication services and scenarios has been planned by the third generation mobile communication partners (3GPP) as an important content of Rel16. The V2x communication supports Sidelink (SL) communication between vehicle-mounted devices and other devices. It also needs to be considered that when the user equipment (UE) is located in a place where there is no Global Navigation Satellite System (GNSS) signal or base station signal, the UE needs to acquire synchronization of other UEs within the coverage of the GNSS signal and/or the base station signal. That is, the UE within the coverage of the GNSS signal and/or the base station signal sends the synchronization signal through the sidelink, to facilitate the synchronization communication of the UE in a place where there is no GNSS signal and/or base station signal.

In the related art, the synchronization technology of 5G V2X sidelink communication follows the synchronization technology of 5G NR communication, which mainly considers the continuity of 5G V2X technology and 5G NR technology. For example, in 5G NR, the synchronization signal is composed of a plurality of Orthogonal Frequency Division Multiplexing (OFDM) symbols. The maximum number L of Synchronization Signal Blocks (SSB, SS/PBCH Block) in one period can be 4, 8 or 64 according to the frequency band. Each SSB can correspond to one beam. The beam can also be not completely sent, that is, the number of SSBs actually sent is less than L. The period of SSB is 5 ms, 10 ms, 20 ms . . . up to 160 ms. The base station generally selects one configuration, such as a default configuration of the UE based on 20 ms for initial access. However, the related technologies do not take into account the special requirements of the V2X service, resulting in poor synchronization effects, and a low utilization rate of wireless resources, affecting the user experience.

SUMMARY

Embodiments of the present disclosure provide a method and an apparatus for sending a synchronization signal. The technical solution is as follows.

According to a first aspect of embodiments of the present disclosure, there is provided a method for sending a synchronization signal, applied to a user equipment (UE) supporting vehicle to everything sidelink communication. The UE may measure a signal intensity of a received communication signal. The UE may also determine a target configuration parameter for sending a synchronization signal according to the signal intensity of the received communication signal. The UE may further send the synchronization signal by using the target configuration parameter.

According to a second aspect of the present disclosure, there is provided a computing device. The computing device may include one or more processors, a non-transitory computer-readable memory storing instructions executable by the one or more processors. The one or more processors may be configured to measure a signal intensity of a received communication signal. The one or more processors may also determine a target configuration parameter for sending a synchronization signal according to the signal intensity of the received communication signal. The one or more processors may further send the synchronization signal by using the target configuration parameter.

According to a third aspect of the present disclosure, there is provided a non-transitory computer readable storage medium having stored therein instructions. When the instructions are executed by one or more processors, the instructions may cause the one or more processors to measure a signal intensity of a received communication signal. The instructions may further cause the one or more processors to determine a target configuration parameter for sending a synchronization signal according to the signal intensity of the received communication signal. The instructions may also cause the one or more processors to send the synchronization signal by using the target configuration parameter.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the disclosure, and together with the specification are used to explain the principle of the disclosure.

DETAILED DESCRIPTION

The exemplary embodiments will be described in detail herein, and examples thereof are shown in the accompanying drawings. When the following description refers to the drawings, unless otherwise indicated, the same numbers in different drawings indicate the same or similar elements. The implementations described in the following exemplary embodiments do not represent all implementations consistent with the present disclosure. On the contrary, they are merely examples of apparatuses and methods consistent with some aspects of the present disclosure as detailed in the appended claims.

Embodiments of the present disclosure provide a method for sending a synchronization signal, applied to a user equipment supporting vehicle to everything sidelink communication, and the method including: measuring a signal intensity of a received communication signal; determining a target configuration parameter for sending a synchronization signal according to the signal intensity of the communication signal; and sending the synchronization signal by using the target configuration parameter. In the method for sending a synchronization signal provided by embodiments of the disclosure, by means of analyzing the signal intensity of a received communication signal, a target configuration parameter for sending a synchronization signal is automatically determined, so as to realize the supply of differentiated synchronization signal sending resources to a scenario covering signals of different intensities, thereby being able to improve the synchronization effect of a user equipment within a weak coverage area, meet special requirements of V2X services, such as directionality, periodic characteristics and repetitive requirements, increase the utilization rate of radio resources and enhance the user experience. It should be pointed out that, in the embodiments of the present disclosure, user equipment may include, for example, vehicle-mounted devices, handheld devices, and roadside devices that support the sidelink communication of the Vehicle to Everything. The handheld devices may include, for example, smart phones, tablet computers, desktops, laptops or wearable devices (such as bracelets, smart glasses, etc.) and other electronic devices.

Based on the above analysis, the following specific embodiments are proposed.

Figure 1A:
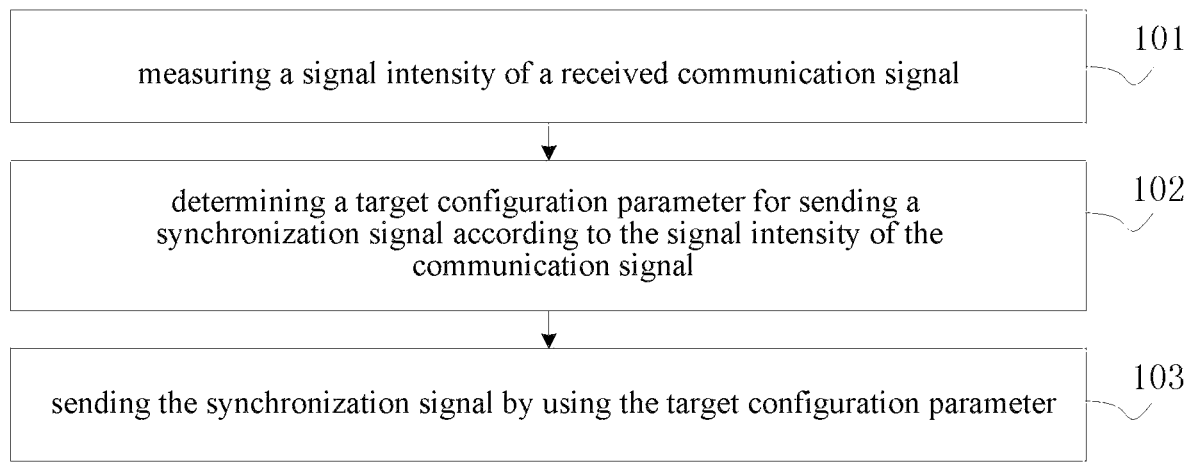
FIG. 1a is a flowchart of a method for sending a synchronization signal according to an exemplary embodiment.

FIG. 1*a* is a flowchart showing a method for sending a synchronization signal according to an exemplary embodiment. The method can be applied to a user equipment supporting vehicle to everything sidelink communication. As shown in FIG. 1*a*, the method includes following steps 101-103.

In step 101, a signal intensity of a received communication signal is measured.

For example, the communication signal includes: a signal of a network-side device of a wireless communication network, or a satellite positioning signal. The network-side device, for example, includes a base station, a relay station, or a wireless access point (AP). The user equipment measures the signal intensity of the received communication signal in real time.

In step 102, a target configuration parameter for sending a synchronization signal is determined according to the signal intensity of the communication signal.

As an example, the target configuration parameter may include any one of following parameters or a combination thereof: the number of times of repeatedly sending Synchronization Signal Blocks (SSB) in each SSB sending period, the number of SSBs sent in each SSB sending period, a SSB sending period, or a sending direction of the sent beam.

As an example, the implementations of determining a target configuration parameter for sending a synchronization signal according to the signal intensity of the communication signal may include any one of the following manners or a combination thereof.

The first implementation: a current configuration parameter for sending a synchronization signal is acquired; and it is judged whether the signal intensity of the communication signal is less than a preset signal intensity threshold, which at least includes following three situations.

The first situation: the communication signal coverage is normal. When the signal intensity of the communication signal is not less than the preset signal intensity threshold, the synchronization signal is continued to be sent using the current configuration parameters, and the process ends.

The second situation: the communication signal coverage is weak. When the signal intensity of the communication signal is less than the preset signal intensity threshold, it is determined that the user equipment is in the weak coverage area of the communication signal. At this time, any one of following first to fourth operations or a combination thereof is performed for the current configuration parameters, to obtain the target configuration parameters:

the first operation 1: increasing the number of times of repeatedly sending SSBs in each SSB sending period in the current configuration parameter;

the second operation 2: increasing the number of SSBs sent in each SSB sending period in the current configuration parameter;

the third operation 3: decreasing the SSB sending period in the current configuration parameter;

the fourth operation 4: determining a weak coverage direction of the communication signal according to a receiving direction of the communication signal, and determining the weak coverage direction as the sending direction of the sent beam.

Optionally, the sending direction of the sent beam determined in the fourth operation may be determined as the sending direction of the sent beam corresponding to the SSB that is added and repeatedly sent in the first operation, so as to increase the number of times of repeatedly sending SSBs in each SSB sending period in the weak coverage direction of the communication signal, increase the density of sending the SSBs, and improve the synchronization effect of user equipment in the weak coverage area.

The sending direction of the sent beam determined in the fourth operation may also be determined as the sending direction of the sent beam corresponding to the added SSB in the second operation 2, so as to increase the number of SSBs sent in each SSB sending period in the weak coverage direction of the communication signal, increase the density of sending the SSBs, and improve the synchronization effect of user equipment in the weak coverage area.

The sending direction of the sent beam determined in the fourth operation may be determined as the sending direction of the sent beam corresponding to the added SSB in the second operation 2, and the SSB is only sent in the weak coverage direction of the communication signal, which saves wireless resources and improves the synchronization effect of user equipment in the weak coverage area.

The third situation: there is no communication signal coverage. The user equipment will continuously measure the signal intensity of the communication signal. If it is detected that the signal intensity of the communication signal is weaker than the preset signal threshold, it is determined that the user equipment is located in an area wherein there is no communication signal coverage. At this time, any one of the above first to third operations or a combination thereof is performed for the current configuration parameter, to obtain the target configuration parameter. For example, the SSB sending period in the current configuration parameter is decreased, the number of times of repeatedly sending SSBs in each SSB sending period in the current configuration parameter is increased, the number of SSBs sent in each SSB sending period in the current configuration parameter is increased, or the like.

Figure 1B:
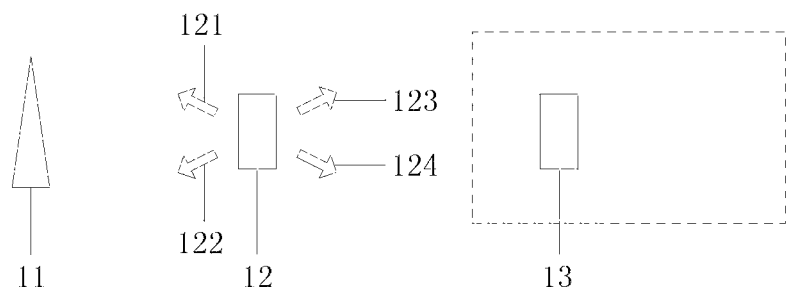
FIG. 1b is a schematic diagram of a sending direction of a sent beam in the related art.

For example, FIG. 1b is a schematic diagram of the sending direction of the sent beam in the related art. Referring to FIG. 1b, it is assumed that the direction of the user equipment 12 facing away from the base station 11, that is, the direction of the dashed box in FIG. 1b, is the weak coverage direction of the base station 11, and the user equipment 13 is in a weak coverage area. Based on related technologies, the sending directions of the sent beam 121, the sent beam 122, the sent beam 123 and the sent beam 124 in FIG. 1b are various directions sent from the user equipment 12 as a center, the synchronization effect of the user equipment 13 in the weak coverage area cannot be guaranteed, and there is a problem of waste of wireless resources.

Figure 1C:
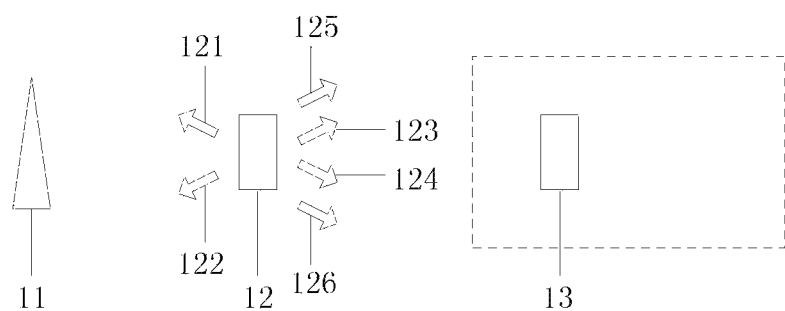
FIG. 1c is a schematic diagram showing a sending direction of a sent beam according to an exemplary embodiment.

FIG. 1c is a schematic diagram showing the sending direction of the sent beam according to an exemplary embodiment. Referring to FIG. 1c, it is assumed that the direction of the user equipment 12 facing away from the base station 11, that is, the direction of the dashed box in FIG. 1c, is the weak coverage direction of the base station 11, and the user equipment 13 is in a weak coverage area. According to the above fourth operation, the weak coverage direction is determined as the sending direction of the sent beam 125 and the sent beam 126 corresponding to the added SSBs sent in each SSB sending period, and the coverage of the sent beam 123 and the sent beam 124 is reduced, so as to increase the number of SSBs sent in each SSB sending period in the weak coverage direction of the base station, and improve the synchronization effect of user equipment in the weak coverage area.

Figure 1D:
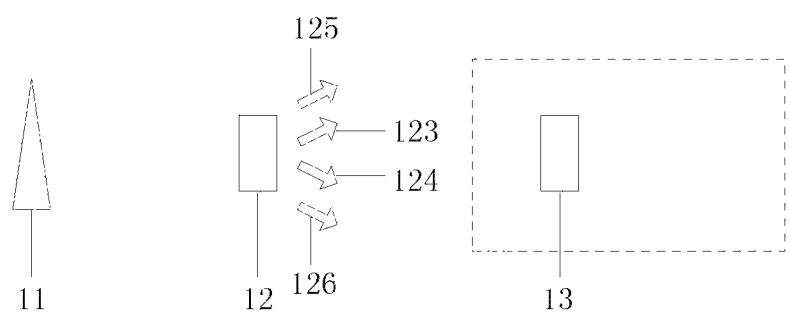
FIG. 1d is a schematic diagram showing a sending direction of a sent beam according to an exemplary embodiment.

FIG. 1d is a schematic diagram showing the sending direction of the sent beam according to an exemplary embodiment. Referring to FIG. 1d, it is assumed that the direction of the user equipment 12 facing away from the base station 11, that is, the direction of the dashed box in FIG. 1d, is the weak coverage direction of the base station 11, and the user equipment 13 is in a weak coverage area. According to the above fourth operation, the weak coverage direction is determined as the sending direction of the sent beam 125 and the sent beam 126 corresponding to the added SSBs sent in each SSB sending period, and the coverage of the sent beam 123 and the sent beam 124 is reduced, which may improve the synchronization effect of user equipment in the weak coverage area. Besides, the SSB is only sent in the weak coverage direction of the communication signal, which may save wireless resources.

The second implementation: when the signal intensity of the communication signal is less than a preset signal intensity threshold, the target configuration parameter corresponding to the signal intensity of the communication signal is determined according to a corresponding relationship between a preset signal intensity and a configuration parameter. For example, multiple sets of configuration parameters are set in advance, and each set of configuration parameters is associated with a signal intensity value or signal intensity range, so as to set the corresponding relationship between the signal intensity and the configuration parameter. When the signal intensity of the communication signal is measured, the target configuration parameter corresponding to the signal intensity of the communication signal is determined by querying the corresponding relationship between the signal intensity and the configuration parameter.

In step 103, the synchronization signal is sent by using the target configuration parameter.

Illustratively, after determining the target configuration parameter for sending the synchronization signal, the user equipment uses the target configuration parameter to send the synchronization signal.

In the technical solution provided by the embodiments of the present disclosure, by means of analyzing the signal intensity of a received communication signal, a target configuration parameter for sending a synchronization signal is automatically determined, so as to realize the supply of differentiated synchronization signal sending resources to a scenario covering signals of different intensities, thereby being able to improve the synchronization effect of a user equipment within a weak coverage area, increase the utilization rate of radio resources and enhance the user experience.

Figure 2:
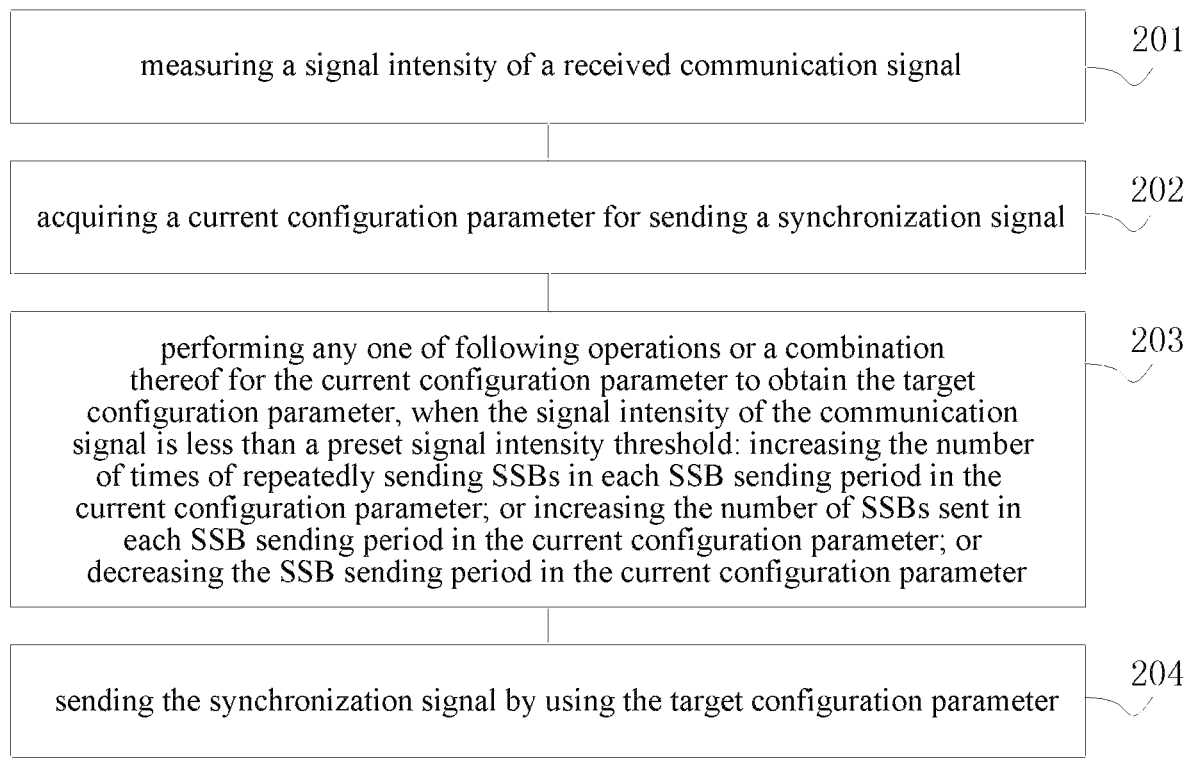
FIG. 2 is a flowchart of a method for sending a synchronization signal according to an exemplary embodiment.

FIG. 2 is a flowchart of a method for sending a synchronization signal according to an exemplary embodiment. As shown in FIG. 2, on the basis of the embodiment shown in FIG. 1a, the method for sending a synchronization signal according to the present disclosure can include following steps 201-204:

step 201: measuring a signal intensity of a received communication signal;

step 202: acquiring a current configuration parameter for sending a synchronization signal;

step 203: performing any one of following operations or a combination thereof for the current configuration parameter to obtain the target configuration parameter, when the signal intensity of the communication signal is less than a preset signal intensity threshold: increasing the number of times of repeatedly sending SSBs in each SSB sending period in the current configuration parameter; or increasing the number of SSBs sent in each SSB sending period in the current configuration parameter; or decreasing the SSB sending period in the current configuration parameter; and step 204: sending the synchronization signal by using the target configuration parameter.

In the technical solution provided by the embodiment of the present disclosure, by increasing the number of times of repeatedly sending SSBs in each SSB sending period in the current configuration parameter, increasing the number of SSBs sent in each SSB sending period in the current configuration parameter, and decreasing the SSB sending period in the current configuration parameter, the synchronization effect of the user equipment in the weak coverage area is improved, the utilization rate of wireless resources is improved and the user experience is improved.

Figure 3:
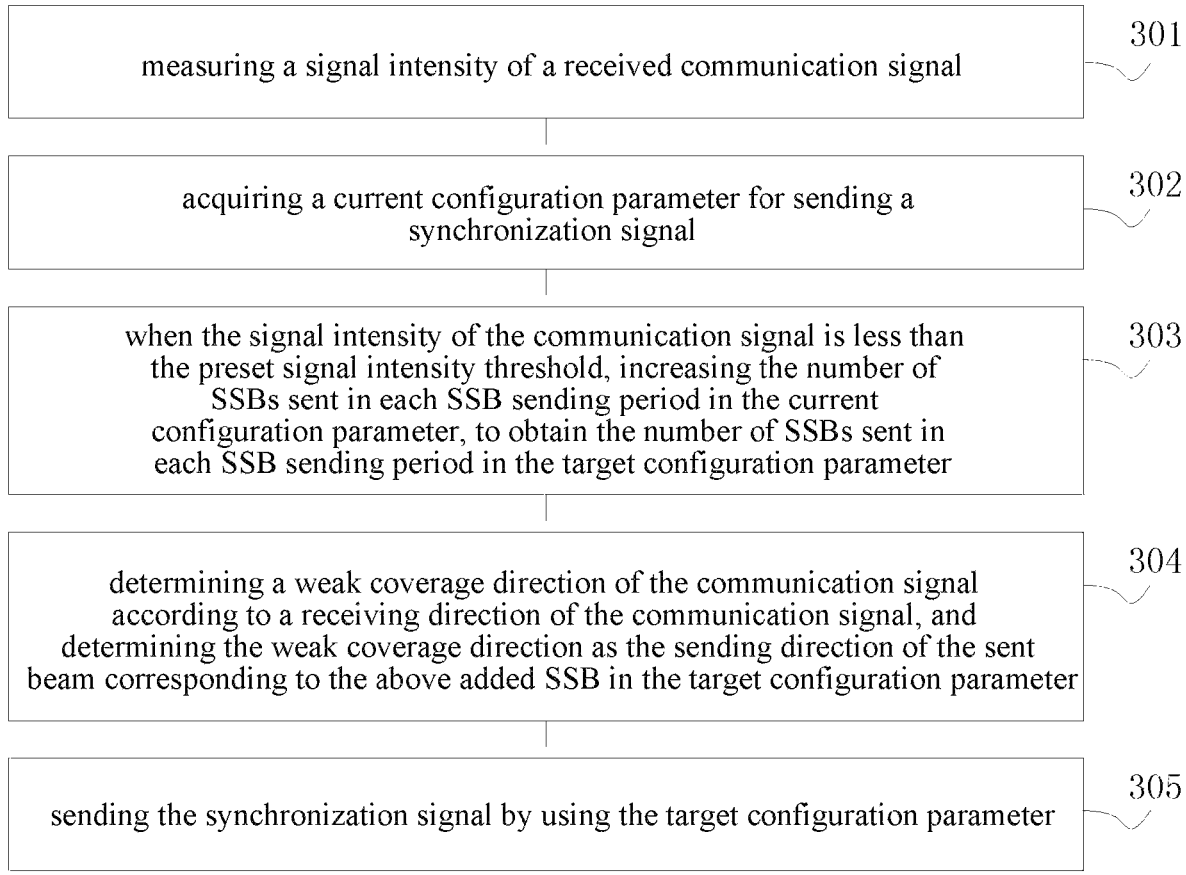
FIG. 3 is a flowchart of a method for sending a synchronization signal according to an exemplary embodiment.

FIG. 3 is a flowchart of a method for sending a synchronization signal according to an exemplary embodiment. As shown in FIG. 3, on the basis of the embodiment shown in FIG. 1a, the method for sending a synchronization signal according to the present disclosure can include following steps 301-305:

step 301: measuring a signal intensity of a received communication signal;

step 302: acquiring a current configuration parameter for sending a synchronization signal;

step 303: when the signal intensity of the communication signal is less than the preset signal intensity threshold, increasing the number of SSBs sent in each SSB sending period in the current configuration parameter, to obtain the number of SSBs sent in each SSB sending period in the target configuration parameter;

step 304: determining a weak coverage direction of the communication signal according to a receiving direction of the communication signal, and determining the weak coverage direction as the sending direction of the sent beam corresponding to the above added SSB in the target configuration parameter; and step 305: sending the synchronization signal by using the target configuration parameter.

In the technical solution provided by the embodiment of the present disclosure, by increasing the number of SSBs sent in each SSB sending period in the weak coverage direction of the communication signal, the synchronization effect of the user equipment in the weak coverage area can be improved, and the utilization rate of wireless resources may be improved and the user experience may be improved.

The following is an embodiment of the apparatus of the present disclosure, which can be used to carry out the method embodiments of the present disclosure.

Figure 4:
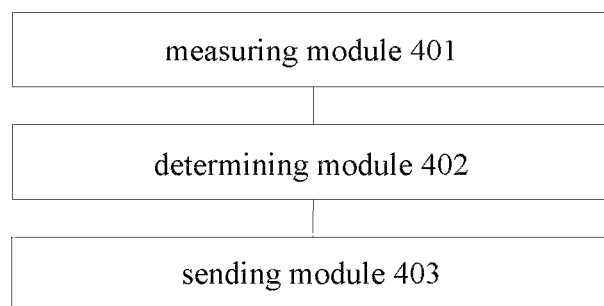
FIG. 4 is a block diagram of an apparatus for sending a synchronization signal according to an exemplary embodiment.

FIG. 4 is a block diagram of an apparatus for sending a synchronization signal according to an exemplary embodiment. The apparatus may be implemented as part or all of a user equipment by software, hardware, or a combination of both. Referring to FIG. 4, the apparatus for sending a synchronization signal includes: a measuring module 401, a determining module 402, and a sending module 403.

The measuring module 401 is configured to measure a signal intensity of a received communication signal.

The determining module 402 is configured to determine a target configuration parameter for sending a synchronization signal according to the signal intensity of the communication signal.

The sending module 403 is configured to send the synchronization signal by using the target configuration parameter.

Through the apparatus provided by the embodiment of the present disclosure, by means of analyzing the signal intensity of a received communication signal, a target configuration parameter for sending a synchronization signal is automatically determined, so as to realize the supply of differentiated synchronization signal sending resources to a scenario covering signals of different intensities, thereby being able to improve the synchronization effect of a user equipment within a weak coverage area, increase the utilization rate of radio resources and enhance the user experience.

In one embodiment, the target configuration parameter includes any one of following parameters or a combination thereof: the number of times of repeatedly sending Synchronization Signal Blocks (SSB) in each SSB sending period, the number of SSBs sent in each SSB sending period, or a SSB sending period.

Figure 5:
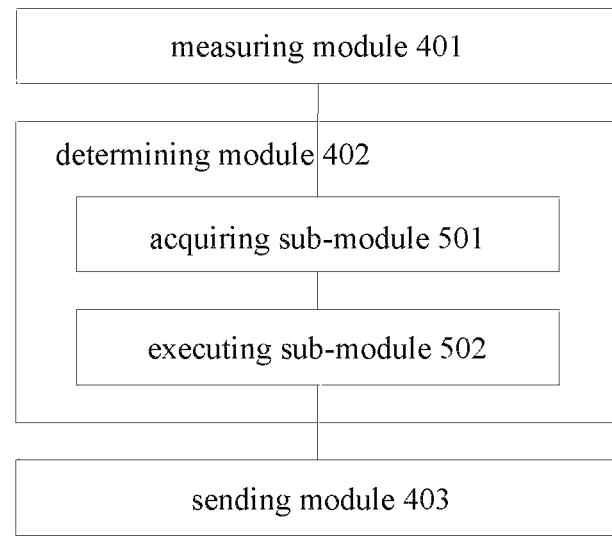
FIG. 5 is a block diagram of an apparatus for sending a synchronization signal according to an exemplary embodiment.

In an embodiment, as shown in FIG. 5, the apparatus for sending a synchronization signal shown in FIG. 4 may further include configuring the determining module 402 to include: an acquiring sub-module 501 and an executing sub-module 502.

The acquiring sub-module 501 is configured to acquire a current configuration parameter for sending a synchronization signal.

The executing sub-module 502 is configured to perform any one of following operations or a combination thereof for the current configuration parameter to obtain the target configuration parameter, when the signal intensity of the communication signal is less than a preset signal intensity threshold:

increasing the number of times of repeatedly sending SSBs in each SSB sending period in the current configuration parameter;

increasing the number of SSBs sent in each SSB sending period in the current configuration parameter;

decreasing the SSB sending period in the current configuration parameter.

Figure 6:
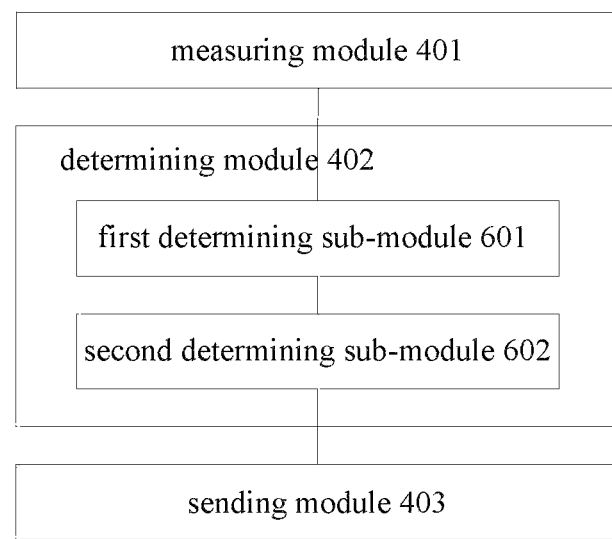
FIG. 6 is a block diagram of an apparatus for sending a synchronization signal according to an exemplary embodiment.

In one embodiment, the target configuration parameter includes: a sending direction of a sent beam. As shown in FIG. 6, the apparatus for sending a synchronization signal shown in FIG. 4 may further include configuring the determining module 402 to include a first determining sub-module 601 and a second determining sub-module 602.

The first determining sub-module 601 is configured to determine a weak coverage direction of the communication signal according to a receiving direction of the communication signal, when the signal intensity of the communication signal is less than a preset signal intensity threshold.

The second determining sub-module 602 is configured to determine the weak coverage direction as the sending direction of the sent beam.

In an embodiment, the determining module is configured to: determine the target configuration parameter corresponding to the signal intensity of the communication signal according to a corresponding relationship between a preset signal intensity and a configuration parameter, when the signal intensity of the communication signal is less than a preset signal intensity threshold.

In one embodiment, the communication signal includes: a signal of a network-side device of a wireless communication network, or a satellite positioning signal.

In an exemplary embodiment, there is provided an apparatus for sending a synchronization signal, including:

a processor; and a memory for storing processor executable instructions, wherein the processor is configured to perform:

measuring a signal intensity of a received communication signal;

determining a target configuration parameter for sending a synchronization signal according to the signal intensity of the communication signal; and sending the synchronization signal by using the target configuration parameter.

In one embodiment, the target configuration parameter includes any one of following parameters or a combination thereof:

the number of times of repeatedly sending Synchronization Signal Blocks (SSB) in each SSB sending period, the number of SSBs sent in each SSB sending period, or a SSB sending period.

In one embodiment, the processor can also be configured to:

acquire a current configuration parameter for sending a synchronization signal;

perform any one of following operations or a combination thereof for the current configuration parameter to obtain the target configuration parameter, when the signal intensity of the communication signal is less than a preset signal intensity threshold:

increasing the number of times of repeatedly sending SSBs in each SSB sending period in the current configuration parameter;

increasing the number of SSBs sent in each SSB sending period in the current configuration parameter;

decreasing the SSB sending period in the current configuration parameter.

In one embodiment, the target configuration parameter includes: a sending direction of a sent beam;

the processor can also be configured to:

determine a weak coverage direction of the communication signal according to a receiving direction of the communication signal, when the signal intensity of the communication signal is less than a preset signal intensity threshold;

determine the weak coverage direction as the sending direction of the sent beam.

In one embodiment, the processor can also be configured to:

determine the target configuration parameter corresponding to the signal intensity of the communication signal according to a corresponding relationship between a preset signal intensity and a configuration parameter, when the signal intensity of the communication signal is less than a preset signal intensity threshold.

In one embodiment, the communication signal includes: a signal of a network-side device of a wireless communication network, or a satellite positioning signal.

With regard to the apparatus in the above embodiments, the specific manner in which the respective modules perform the operations has been described in detail in the embodiment relating to the method, and will not be explained in detail herein.

Figure 7:
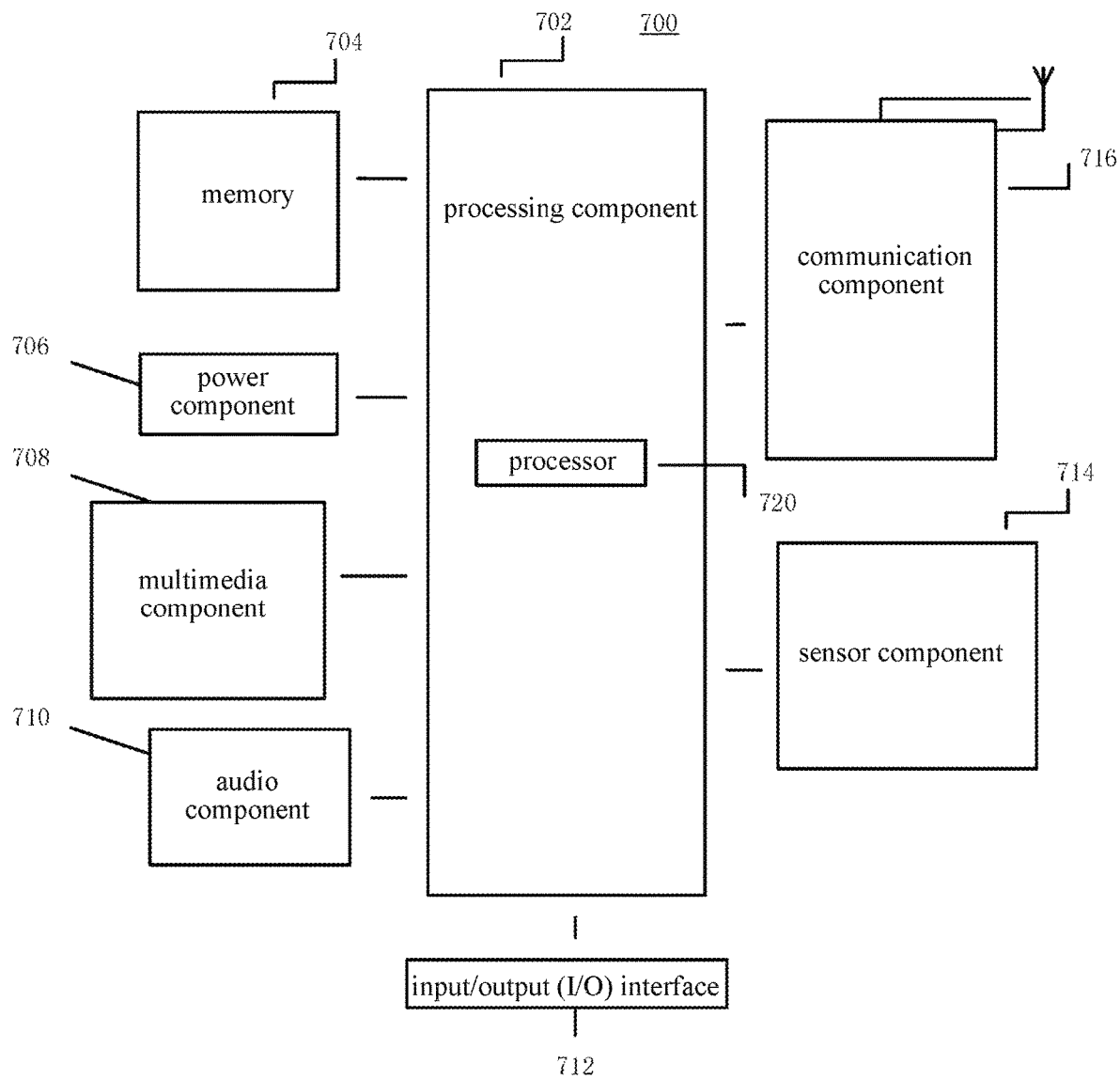
FIG. 7 is a block diagram of an apparatus for sending a synchronization signal according to an exemplary embodiment.

FIG. 7 is a block diagram of an apparatus for sending a synchronization signal according to an exemplary embodiment. The apparatus 700 for sending a synchronization signal may be applied to a user equipment supporting vehicle to everything sidelink communication. The apparatus 700 for sending a synchronization signal may include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the apparatus 700, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules to facilitate the interaction between the processing component 702 and other components. For example, the processing component 702 can include a multimedia module to facilitate the interaction between the multimedia component 708 and the processing component 702.

The memory 704 is configured to store various types of data to support the operation of the apparatus 700. Examples of such data include instructions for any application or method operated on the apparatus 700, such as the contact data, the phone book data, messages, pictures, videos, and the like. The memory 704 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 can include a power management system, one or more power sources, and other components associated with the generation, management, and distribution of power in the apparatus 700.

The multimedia component 708 includes a screen providing an output interface between the apparatus 700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. When the apparatus 700 is in an operation mode, such as a photographing mode or a video mode, the front camera and/or the rear camera can receive external multimedia data. Each of the front camera and the rear camera may be a fixed optical lens system or have focus and optical zoom capability.

The audio component 710 is configured to output and/or input an audio signal. For example, the audio component 710 includes a microphone (MIC) configured to receive an external audio signal when the apparatus 700 is in an operation mode, such as a call mode, a recording mode, and a voice recognition mode. The received audio signal may be further stored in the memory 704 or sent via the communication component 716. In some embodiments, the audio component 710 also includes a speaker for outputting the audio signal.

The I/O interface 712 provides an interface between the processing component 702 and peripheral interface modules, such as a keyboard, a click wheel, buttons, and the like. These buttons may include, but not limited to, a home button, a volume button, a starting button, and a locking button.

The sensor component 714 includes one or more sensors for providing state assessments of various aspects of the apparatus 700. For example, the sensor component 714 can detect an open/closed state of the apparatus 700, relative positioning of components, such as the display and the keypad of the apparatus 700. The sensor component 714 can also detect a change in position of one component of the apparatus 700 or the apparatus 700, the presence or absence of user contact with the apparatus 700, an orientation, or an acceleration/deceleration of the apparatus 700, and a change in temperature of the apparatus 700. The sensor component 714 can also include a proximity sensor configured to detect the presence of nearby objects without any physical contact. The sensor component 714 can also include a light sensor, such as a CMOS or CCD image sensor, configured to use in imaging applications. In some embodiments, the sensor component 714 can also include an accelerometer sensor, a gyroscope sensor, a magnetic sensor, a pressure sensor, or a temperature sensor.

The communication component 716 is configured to facilitate wired or wireless communication between the apparatus 700 and other devices. The apparatus 700 can access a wireless network based on a communication standard, such as Wi-Fi, 2G, 3G or a combination thereof. In an exemplary embodiment, the communication component 716 receives broadcast signals or broadcast associated information from an external broadcast management system via a broadcast channel. In an exemplary embodiment, the communication component 716 also includes a near field communication (NFC) module to facilitate short-range communications. For example, the NFC module can be implemented based on radio frequency identifier (RFID) technology, infrared data association (IrDA) technology, ultra-wideband (UWB) technology, Bluetooth (BT) technology and other technologies.

In an exemplary embodiment, the apparatus 700 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the above methods.

In an exemplary embodiment, there is also provided a non-transitory computer-readable storage medium including instructions, such as a memory 704 including instructions executable by the processor 720 of the apparatus 700 to perform the above methods. For example, the non-transitory computer readable storage medium may be a ROM, a random access memory (RAM), a CD-ROM, a magnetic tape, a floppy disc, and an optical data storage device, or the like.

Figure 8:
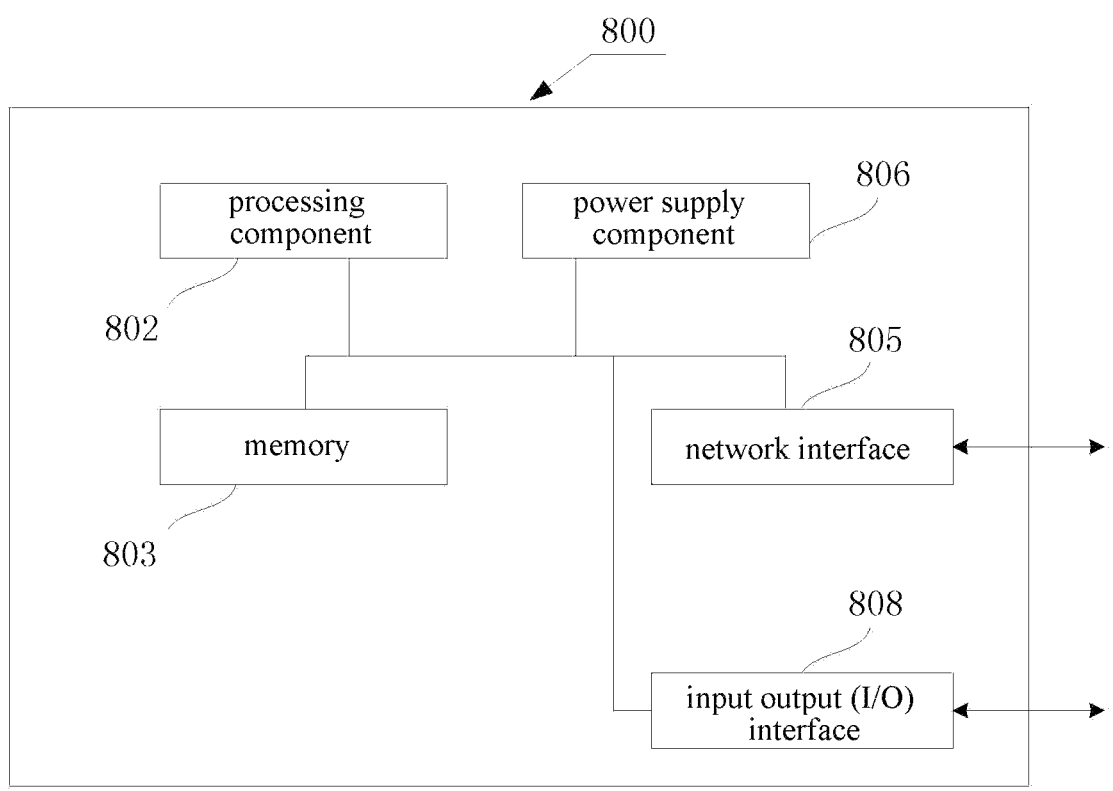
FIG. 8 is a block diagram of an apparatus for sending a synchronization signal according to an exemplary embodiment.

FIG. 8 is a block diagram of an apparatus for sending a synchronization signal according to an exemplary embodiment. For example, the apparatus 800 for sending a synchronization signal may be provided as a server. The apparatus 800 for sending a synchronization signal includes a processing component 822, which further includes one or more processors, and a memory resource represented by a memory 803 for storing instructions executable by the processing component 802, such as application programs. The application program stored in the memory 803 may include one or more modules each corresponding to a set of instructions. In addition, the processing component 802 is configured to execute instructions to execute the above methods.

The apparatus 800 for sending a synchronization signal may also include a power supply component 806 configured to perform power management of the apparatus 800 for sending a synchronization signal, a wired or wireless network interface 805 configured to connect the apparatus 800 for sending a synchronization signal to a network, and an input output (I/O) interface 808. The apparatus 800 for sending a synchronization signal can operate an operating system stored in the memory 803, such as Windows Server™, Mac OS X™, Unix™, Linux™, FreeBSD™ or the like.

There is also provided a non-transitory computer-readable storage medium. When the instructions in the storage medium are executed by the processor of the apparatus 700 for sending a synchronization signal or the apparatus 800 for sending a synchronization signal, the apparatus 700 for sending a synchronization signal or the apparatus 800 for sending a synchronization signal can perform the following method for sending a synchronization signal. The method is applied to a user equipment supporting vehicle to everything sidelink communication, and the method includes:

measuring a signal intensity of a received communication signal;

determining a target configuration parameter for sending a synchronization signal according to the signal intensity of the communication signal; and sending the synchronization signal by using the target configuration parameter.

In an embodiment, the target configuration parameter includes any one of following parameters or a combination thereof:

the number of times of repeatedly sending Synchronization Signal Blocks (SSB) in each SSB sending period, the number of SSBs sent in each SSB sending period, or a SSB sending period.

In an embodiment, the determining a target configuration parameter for sending a synchronization signal according to the signal intensity of the communication signal includes:

acquiring a current configuration parameter for sending a synchronization signal;

performing any one of following operations or a combination thereof for the current configuration parameter to obtain the target configuration parameter, when the signal intensity of the communication signal is less than a preset signal intensity threshold:

increasing the number of times of repeatedly sending SSBs in each SSB sending period in the current configuration parameter;

increasing the number of SSBs sent in each SSB sending period in the current configuration parameter;

decreasing the SSB sending period in the current configuration parameter.

In an embodiment, the target configuration parameter includes: a sending direction of a sent beam;

the determining a target configuration parameter for sending a synchronization signal according to the signal intensity of the communication signal includes:

determining a weak coverage direction of the communication signal according to a receiving direction of the communication signal, when the signal intensity of the communication signal is less than a preset signal intensity threshold;

determining the weak coverage direction as the sending direction of the sent beam.

In an embodiment, the determining a target configuration parameter for sending a synchronization signal according to the signal intensity of the communication signal includes:

determining the target configuration parameter corresponding to the signal intensity of the communication signal according to a corresponding relationship between a preset signal intensity and a configuration parameter, when the signal intensity of the communication signal is less than a preset signal intensity threshold.

In an embodiment, the communication signal includes: a signal of a network-side device of a wireless communication network, or a satellite positioning signal.

Those skilled in the art will easily think of other embodiments of the present disclosure after considering the description and practicing the disclosure disclosed herein. This application is intended to cover any variations, uses, or adaptive changes of the present disclosure, which follow the general principles of the present disclosure and include common knowledge or conventional technical means in the technical field not disclosed in the present disclosure. The description and the embodiments are only regarded as exemplary, and the true scope and spirit of the present disclosure are indicated by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A method for sending a synchronization signal, performed by a user equipment (UE) supporting vehicle to everything sidelink communication, and the method comprising:
    measuring a signal intensity of a received communication signal, wherein the received communication signal comprises: a signal of a network-side device of a wireless communication network, or a satellite positioning signal;
    determining a target configuration parameter for sending a synchronization signal according to the signal intensity of the received communication signal, wherein the target configuration parameter comprises any one of following parameters or a combination thereof: a number of times of repeatedly sending Synchronization Signal Blocks (SSB) in each SSB sending period, or a number of SSBs sent in each SSB sending period; and
    sending the synchronization signal by using the target configuration parameter.

2. The method according to claim 1, wherein determining a target configuration parameter for sending the synchronization signal according to the signal intensity of the received communication signal comprises:
    acquiring a current configuration parameter for sending a synchronization signal;
    obtaining, when the signal intensity of the received communication signal is less than a preset signal intensity threshold, the target configuration parameter, by:
    increasing the number of times of repeatedly sending SSBs in each SSB sending period in the current configuration parameter; or
    increasing the number of SSBs sent in each SSB sending period in the current configuration parameter.

3. The method according to claim 1, wherein determining the target configuration parameter for sending a synchronization signal according to the signal intensity of the received communication signal comprises:
    determining, when the signal intensity of the received communication signal is less than a preset signal intensity threshold, a weak coverage direction of the received communication signal according to a receiving direction of the received communication signal, wherein the target configuration parameter comprises a transmission direction of a transmission beam of the synchronization signal;
    determining the weak coverage direction as the transmission direction of the transmission beam.

4. The method according to claim 1, wherein the determining the target configuration parameter for sending a synchronization signal according to the signal intensity of the received communication signal comprises:
    determining, when the signal intensity of the received communication signal is less than a preset signal intensity threshold, the target configuration parameter corresponding to the signal intensity of the received communication signal according to a corresponding relationship between a preset signal intensity and a configuration parameter.

5. A computing device comprising:
    one or more processors; and
    a non-transitory computer-readable storage medium storing instructions executable by the one or more processors,
    wherein the one or more processors are configured to:
    measure a signal intensity of a received communication signal, wherein the received communication signal comprises: a signal of a network-side device of a wireless communication network, or a satellite positioning signal;
    determine a target configuration parameter for sending a synchronization signal according to the signal intensity of the received communication signal, wherein the target configuration parameter comprises any one of following parameters or a combination thereof: a number of times of repeatedly sending Synchronization Signal Blocks (SSB) in each SSB sending period, or a number of SSBs sent in each SSB sending period; and
    send the synchronization signal by using the target configuration parameter.

6. The computing device according to claim 5, wherein the processor is further configured to:
    acquire a current configuration parameter for sending a synchronization signal;
    obtain, when the signal intensity of the received communication signal is less than a preset signal intensity threshold, the target configuration parameter by:
    increasing the number of times of repeatedly sending SSBs in each SSB sending period in the current configuration parameter;
    increasing the number of SSBs sent in each SSB sending period in the current configuration parameter.

7. The computing device according to claim 5, wherein the processor is further configured to:
    determine, when the signal intensity of the received communication signal is less than a preset signal intensity threshold, a weak coverage direction of the received communication signal according to a receiving direction of the received communication signal, wherein the target configuration parameter comprises a transmission direction of a transmission beam of the synchronization signal; and
    determine the weak coverage direction as the transmission direction of the transmission beam.

8. The computing device according to claim 5, wherein the processor is further configured to:
    determine, when the signal intensity of the received communication signal is less than a preset signal intensity threshold, the target configuration parameter corresponding to the signal intensity of the received communication signal according to a corresponding relationship between a preset signal intensity and a configuration parameter.

9. A non-transitory computer readable storage medium storing a instructions for execution by a computing device having one or more processors, wherein the instructions, when executed by one or more processors, cause the computing device to perform acts comprising:
    measuring a signal intensity of a received communication signal, wherein the received communication signal comprises: a signal of a network-side device of a wireless communication network, or a satellite positioning signal;
    determining a target configuration parameter for sending a synchronization signal according to the signal intensity of the received communication signal, wherein the target configuration parameter comprises any one of following parameters or a combination thereof: a number of times of repeatedly sending Synchronization Signal Blocks (SSB) in each SSB sending period, or a number of SSBs sent in each SSB sending period; and sending the synchronization signal by using the target configuration parameter.

\* \* \* \* \*